United States Patent [19]

Rosette et al.

[11] Patent Number: 4,839,090
[45] Date of Patent: Jun. 13, 1989

[54] EXTRUSION OF MACROCRYSTAL SCINTILLATION PHOSPHORS

[75] Inventors: King H. Rosette, Chagrin Falls; Herbert Packer, Cleveland Heights, both of Ohio

[73] Assignee: Harshaw/Filtrol, Cleveland, Ohio

[21] Appl. No.: 519,886

[22] Filed: Aug. 3, 1983

Related U.S. Application Data

[63] Continuation of Ser. No. 215,732, Dec. 12, 1980, which is a continuation of Ser. No. 90,506, Oct. 31, 1979, abandoned, which is a continuation of Ser. No. 875,318, Feb. 6, 1978, abandoned, which is a continuation of Ser. No. 524,968, Nov. 18, 1974, abandoned, which is a continuation-in-part of Ser. No. 180,087, Sep. 13, 1974, abandoned, which is a continuation-in-part of Ser. No. 139,217, Apr. 30, 1971, abandoned.

[51] Int. Cl.[4] .............................................. C09K 11/61
[52] U.S. Cl. ............................... 252/301.4 H; 264/21
[58] Field of Search .................... 252/301.4 H; 264/1, 264/21

[56] References Cited

U.S. PATENT DOCUMENTS 4,171,400 10/1979 Rosette et al. ............... 252/301.4 H

FOREIGN PATENT DOCUMENTS 7215250 of 0000 France .
792071 3/1958 United Kingdom ........ 252/301.4 H
796654 6/1958 United Kingdom ........ 252/301.4 H Primary Examiner—Jack Cooper
Attorney, Agent, or Firm—Cushman, Darby & Cushman

[57] ABSTRACT

Ionic salts containing minor amounts of an activator and useful as scintillation phosphors are formed by extrusion of a macrocrystal of either a single crystal or a melt-grown multiple crystal ingot at a temperature below its melting point and under sufficient pressure to form a fully dense, homogeneous polycrystalline mass, the scintillation properties of which are essentially the same as, or better than, those of the original macrocrystal.

5 Claims, 1 Drawing Sheet

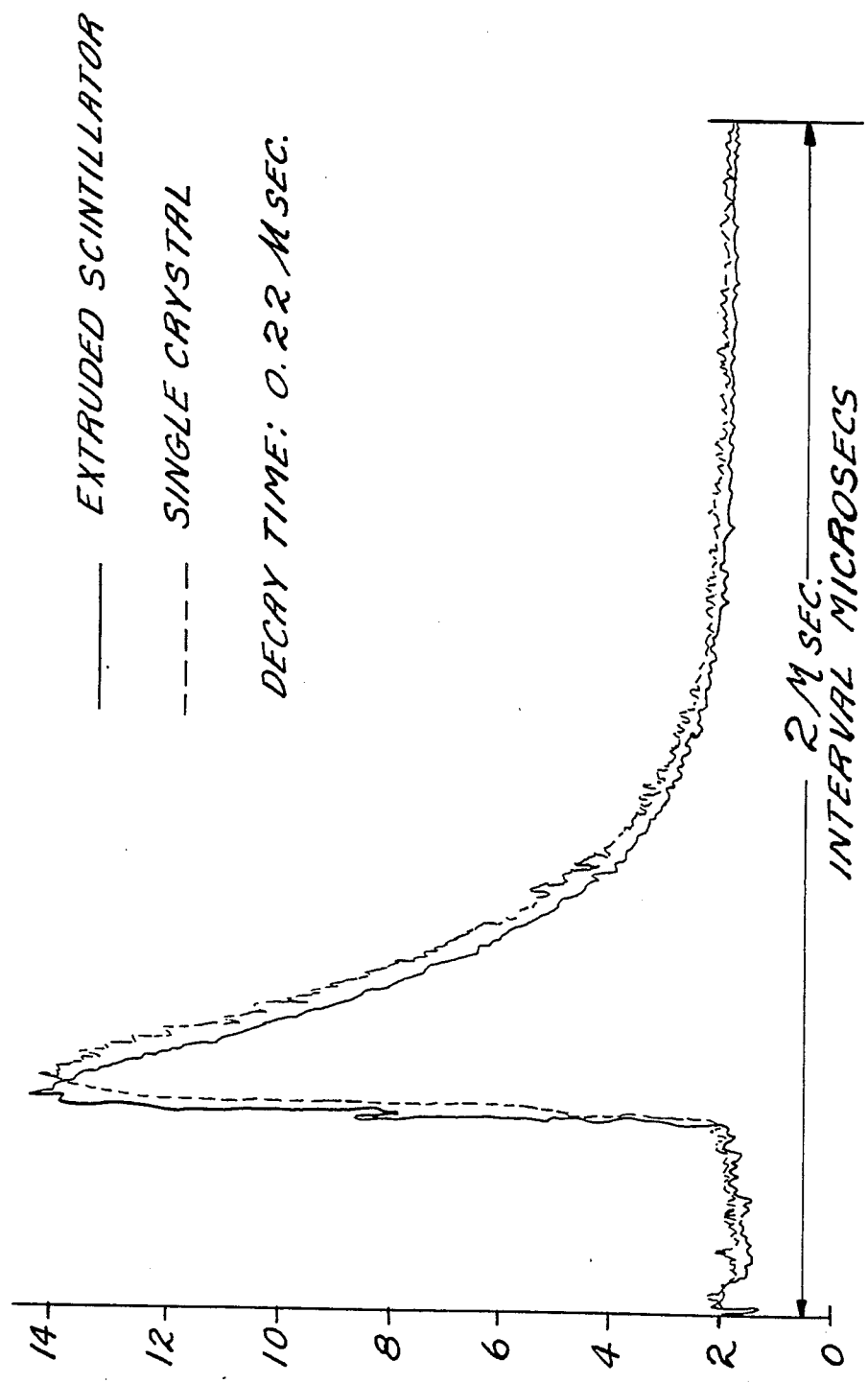

EXTRUSION OF MACROCRYSTAL SCINTILLATION PHOSPHORS

CROSS REFERENCES TO RELATED APPLICATION

This is a continuation, of application Ser. No. 215,732, filed Dec. 12, 1980 which is a continuation of Ser. No. 90,506, filed Oct. 31, 1979 (now abandoned) which is a continuation of application Ser. No. 875,318, filed Feb. 6, 1978 (now abandoned) which is a continuation of Ser. No. 524,968, filed Nov. 18, 1974 (now abandoned), which is a continuation-in-part of Ser. No. 180,087, filed Sept. 13, 1974 (now abandoned), which is a continuation-in-part of Ser. No. 139,217, filed Apr. 30, 1971 (now abandoned).

BACKGROUND OF THE INVENTION

The bulk of the interest in crystal technology today, particularly with respect to those crystals used in optical and electronic applications, is focused on monocrystalline bodies obtained from polycrystalline ones. The instant invention, concerned with scintillation crystals, is oppositely directed, namely, to the fabrication of polycrystalline bodies from monocrystalline ones.

The scintillation counter has become a familiar instrument for the detection of many types of ionizing radiation in a wide variety of applications. This growth has been accelerated by the inherent advantages of this type of detector over other means of measurement. These advantages include high sensitivity of gamma rays, availability in a relatively wide range of physical sizes, response proportional to the incident radiation, rapid response time, and fast decay times. Such characteristics have made this type of detector useful in geophysical surveys of uranium and oil, clinical measurement of radio isotopes, radiation monitoring of personnel exposure, as well as many applications in nuclear physics and research.

The basis of a scintillation counting system is the ability of the phosphor to convert into light emission some fraction of the energy lost by ionization during the passage of a charged particle through the material. This emitted light is picked up by the sensitive photocathode of a photomultiplier tube, producing an electrical pulse which can be similar to the light output from the crystal in both magnitude and duration. Depending upon the amplification achieved by the phototube alone, this pulse may be of sufficient size to activate a scaler or rate meter directly, or may require external amplification. For example, a large scintillation phosphor is used as a camera plate coupled to a plurality of photomultiplier tubes used for the detection of ionizing radiation in connection with the analysis of gamma radiation emanating from patients who are injected with specific tracer isotopes.

In general, there are four categories of phosphors used for beta-gamma radiation detection: inorganic crystals, organic crystals, plastic phosphors, and liquid phosphors. The instant invention deals specifically with inorganic crystals, particularly because of their desirable luminescent characteristics, which include a higher density for greater absorption of gamma rays, increased pulse height for detection of low energy interactions, and decay times short enough for fast counting. More particularly, since certain doped alkali metal halides and alkaline earth metal halides exhibit such desirable characteristics as high density, high light output, transparency, and suitable index of refraction, it is with these inorganic crystals that the instant invention is concerned.

More recently, the relatively wide range of physical size referred to hereinabove, in which inorganic scintillator crystals are available, has been found not to be wide enough. The exacting requirements of camera plates, windows, domes, and lenses large enough for modern commercial and military requirements are drawn to crystals substantially in excess of one foot in at least one dimension. Large scintillators in this size range are presently formed from a macrocrystal, which may be either a single crystal or a section of a multiple crystal melt-grown ingot. An ingot is grown in a diameter large enough to yield the scintillation phosphor desired, and sections of the ingot in the desired thickness are sliced from the ingot. Where the dimensions of the desired scintillation phosphor are in excess of those of the ingot that can melt-grown, sections of the ingot are sliced and then adhesively bonded together to from a composite. Attempts to form scintillation phosphors by hot-pressing a polycrystalline aggregate such as a finely divided, pure powder of an ionic salt in the manner described in U.S. Pat. No. 3,359,066 have been conspicuously unsuccessful. Thus, as of the present time, there is no substitute for the arduous devotion which is a perquisite of successful fabrication of a large scintillator by one of the methods described hereinabove. Even so, the end result is a scintillator of determined fragility and, particularly when it is a composite, of scintillation properties which clearly redound to the fact that it is a composite, and therefore suffers from the drawbacks of degradation of light output due to the optical interfaces. No matter how carefully the faces of sections are polished before they are bonded into a composite, there is no known way of eliminating the undesirable effects of the interface. Most importantly, a macrocystal scintillation phosphor, whether a single crystal, a section of a meltgrown multiple crystal ingot, or composite, is prone to cleavage from thermal or mechanical shock, particularly if it is jarred or jolted in a favorable direction. The scintillation phosphors of the instant invention, formed by extrusion of a doped alkali metal halide macrocrystal permit the fabrication not only of phosphors of indefinite length and arbitrary cross section but also of phosphors which, because of their polycrystalline structure, are at least twice as strong as the parent macrocrystal.

It is known that extrusion of a sodium chloride, single crystal billet, not a scintillator, fitted tightly into an extrusion chamber and forced through an extrusion die maintained at various temperatures above 300° C., will yield a rod of polycrystalline sodium chloride which is completely clear and free from porosity. ("Mechanical Properties of Polycrystalline Sodium Chloride" by R.J. Stokes, *Proceedings of the British Ceramic Society*, Vol. 6, page 192, June 1966). This work was done in connection with a study of the mechanical properties of polycrystalline sodium chloride in relation to those of polycrystalline magnesium oxide. MgO has a similar lattice structure but a melting point of about 2650° C., which is so high as to make the direct study of this "more technologically significant material" all but impossible. Reason for the choice of sodium chloride, other than from the strength of ceramics, and the fundamental aspect of understanding the role of grain boundaries and the deformation of solids as a whole, is that it is an ionic solid which is transparent and affords the opportunity for examining grain-boundary interfaces within the solid rather than their intersection with an external surface, as is the case with opaque materials; and, that being a non-metallic solid, it possesses a wide range of crystal structures and shows a wide variety of slip parameters. Ionic solids thus provide a greater choice of materials on which possible correlations between slip mode and polycrystalline deformability can be examined. The remainder of the disclosure is concerned solely with polycrystalline deformability.

In another study entilted "Effect of Temperature on the Deformation of KC1-KBr Alloys" by Stoloff, Lezius, and Johnston (*Journal of Applied Physics,* Vol. 34, No. 11, pages 3315, 1963), it was shown that pure potassium chloride single crystals and alloys of potassium chloride and potassium bromide containing from 0.6 to 19 molar per cent potassium bromide, and from which single alloy crystals were formed, may be extruded at 500° to 600° C. through a tungsten carbide die with an extrusion ratio of 16:1 to yield polycrystalline rods which have equiaxed structures with an average grain diameter of 0.35 mm. Extrusion at lower temperatures produced duplex, non-equiaxed grain structures, while extrusion at higher temperatures resulted in only a slightly larger grain sizes. Neither potassium chloride nor the alloy crystals are scintillators, and the remainder of the study is devoted to the effect of temperature, crack propagation, and strength of the polycrystalline extrudates obtained.

In still another reference, entitled "The Scintillation Mechanism in Thallium-Activated Sodium Iodide" (Cooke and Palser, *IEEE Transactions on Nuclear Science,* Vol. NS-11, No. 3, page 15, 1964) a single crystal scintillator was stressed and its transmission and emission characteristics were observed with respect to the plastic deformation which the crystal suffered. It was found that when the plastic deformation exceeded about 15 per cent, the transmission was essentially nullified (see FIG. 5, id.).

Each of the references cited hereinabove recognizes that the single crystal from which the polycrystalline extrudate was formed underwent a general deformation due to the discrete nature of the slip process. Despite this fact, the dopand, present to a minor extent within the crystal structure and without which the ionic salt crystal displays no practical scintillation characteristics, unexpectedly maintains its position within the crystal structure in such a way as to generate light upon exposure to ionizing radiation in the same way, and at least to the same extent as it did in the parent macrocrystal.

SUMMARY OF THE INVENTION

It has been found that a macrocrystal of an activated or doped alkali metal halide or alkaline earth metal halide scintillation phosphor may be transformed from a cleavable macrocrystal to a polycrystalline extrudate which is at least twice as strong and resistant to shock, coupled with a lack of an ability to cleave; at the same time, despite the general deformation of the crystal which forces it to undergo a perfectly general change of shape, the scintillation properties of the polycrystalline extrudate are essentially the same as, or better than, those of the parent macrocrystal.

It has been discovered that a polycrystalline scintillation phosphor may be formed from a doped alkali metal halide or alkaline earth metal halide macrocrystal by extrusion at a temperature below its melting point and under sufficient pressure to yield a relatively small-grained polycrystalline structure randomly oriented about the axis of extrusion without injecting contaminants into it.

It is therefore a general object of this invention to provide a polycrystalline scintillation phosphor extrudate which has essentially the same resolution as that of the macrocrystal ingot from which the extrudate was formed.

It is a specific object of this invention to provide a polycrystalline scintillation phosphor extrudate which has essentially the same decay time as that of the macrocrystal ingot from which the extrudate was formed.

It is another object of this invention to provide a polycrystalline scintillation phosphor extrudate which has essentially the same light disseminating efficiency as that of the macrocrystal ingot from which the extrudate was formed.

It is yet another specific object of this invention to provide a polycrystalline scintillation phosphor extrudate which has at least twice the transverse strength of the macrocrystal ingot from which the extrudate was formed.

The principal feature of the polycrystalline scintillation phosphor extrudate of this invention is that it embodies essentially the same resolution, decay time and light disseminating efficiency characteristics as a scintillation macryocrystal ingot, which characteristics cannot be matched by a scintillation phosphor which is hot-pressed from a finely divided power obtained by comminuting a single crystal scintillator.

These and other objects, features and advantages of this scintillator extrudate will become apparent to those skilled in the art from the following description thereof and the examples set forth herein.

BRIEF DESCRIPTION OF THE DRAWINGS

FIG. 1 demonstrates a comparison of decay time characteristics of single crystal NaI(T1) scintillator depicted in solid outline, and a polycrystalline NaI(T1) scintillator formed by extrusion of a single crystal ingot depicted in dotted outline.

PREFERRED EMBODIMENT OF THE INVENTION

All applications of fully dense scintillation phosphors to date have been limited to essentially monocrystalline bodies formed from a single, large crystal or multiple crystal ingot (sometimes referred to as "multiple component crystal ingot") materials. Commonly used growth systems for the single crystals were growth from the melt, from solution, from vapor, and from a high temperature flux, each growth system being applicable only to a special group of crystals. Particular crystal-growing procedures for optical crystals are disclosed in U.S. Pat. Nos. 3,282,641 and 2,149,076 and in application Ser. No. 314,952. The procedures are generally referred to as "melt-growing crystals in ingot form," usually from a very pure melt of a melt which is carefully doped with a predetermined amount of a dopand. Preferred methods are those of Stockbarger-Bridgman (U.S. Pat. No. 2,149,076), Kyropoulos-Czochralski, Hydrothermal growth, and of Verneuil, through other methods may be used to form an ingot. Sometimes the ingot is a single crystal, and on other occasions, the ingot may be a multiple crystal ingot. Multiple component crystal ingots of cubic materials, when formed by the controlled growth procedures named above, do not show any internal reflection at multiplicity boundaries and for optical applications behave as a single body. The ingot, whether it is a single crystal or a multiple crystal ingot, is cut to obtain an optical body of the desired size, which can then be turned on a lathe, planed on a shaper, sawed or subjected to any of the operations common to the shaping of crystals. The shaped crystals are usually given a finish polish.

A melt-grown multiple crystal ingot of an alkali metal halide or alkaline earth metal halide containing a minor amount of an activator or dopant is used as the essentially monocrystalline parent scintillator crystal which is extruded at a temperature below its melting point and a pressure sufficient to force the parent crystal through an orifice or die opening. The choice of temperature and pressure depends, as will the materials of construction and die assembly, upon the physical and chemical properties of the parent macrocrystal to be extruded. It will be apparent, since a primary object of the instant invention is to prevent contamination of the bulk of the polycrystalline extrudate, that materials of construction of the die assembly are such that they will be relatively inert to the material to be extruded. The following description of a most preferred embodiment of the instant invention is with respect to doped alkali metal halide and alkaline earth metal halide macrocrystals which have been artificially melt-grown.

The crystals of the instant invention comprise both single-phase and single-component ionic crystals, as well as multiphase and multicomponents, in the sense used by Willard Gibbs and extended by Smits (see Findly, "The Phase Rule," Longman Green, New York 6th Edition, 1927, pages 6, 7, and 28). The ionic host crystals used to prepare the scintillation phosphors of the instant invention may be represented by the general formula:

$$M_mX_n$$

wherein M represents an alkali metal or alkaline earth metal, and X represents halogen; m is the integer 1, and n is a integer ranging from 1 to 2 inclusive.

A preferred parent macrocrystal is a single crystal greater than 0.1 in. in nominal diameter or a multiple crystal ingot greater than 2 in. in diameter, wherein the crystals are definable as large monocrystals. As the number of separate crystals in a multiple crystal ingot increases and/or the size of the ingot decreases, the quality and optical properties of the extrudate will be proportionately lessened. Depending upon the particular properties of the extrudate desired, a multiplicity of monocrystals as small as 7 Tyler Mesh in size may be used. In general, it will be found that where a polycrystalline scintillator of high quality is desired, an unacceptable number of defects begin to appear in the extrudate, with small monocrystals in the range below 7 Tyler mesh because, among other problems which are exaggerated, is the surface contamination introduced as a result of the large surface area of the crystals.

Single crystals and multiple crystal ingots, because of their intrinsic nature, are prone to cleave under impact, bend in specific directions, fracture with thermal shock and the like, and are difficult to use in a combination with pulse counting mechanisms under physical conditions which are less than optimal. The extrudate, on the other hand, is entirely polycrystalline, substantially free of internal strain and internal cracks, open boundaries between components, minute voids or negative crystals and the like, will not cleave but will fracture eventually in a random manner, and is at least twice as strong as the parent macrocrystal. Unlike single crystals, the mechanical properties of which vary from crystal to crystal, the polycrystalline extrudate has an entirely predictable uniformity of mechanical properties which may be specified within close tolerances. This makes it possible to fabricate structures which will conform closely to design requirements.

The polycrystalline scintillators of the instant invention are most preferably formed by any method of extrusion wherein the parent macrocrystal to be extruded is subjected to pressure, as by a plunger bearing against the whole mass being fed and extruded, or by moving an orifice against a stationary macrocrystal, or by a screw feed having a substantially constant, relatively large pitch and uniform working face, whereby the macrocrystals lodged between the flights are subjected to a pressure analogous to that exerted by a plunger. The process is most easily carried out on a conventional extrusion press, as described in U.S. Pat. No. 3,532,777 and in copending application Ser. No. 425,090, in which the temperature of the die is controlled so as to maintain the macrocrystal at the desired temperature, which is always less than its melting point. In this way, surprisingly, the submicroscopic characteristics, as for example, the distribution of active atoms in a scintillation crystal, are maintained without introducing any contaminant into the bulk of the crystal.

It will be recognized that a minimal amount of contaminations may be introduced on the surface of the polycrystalline extrudate by virtue of its contact with the die material. In this regard, it will be apparent that the choice of die materials will depend upon the macrocrystal composition to be extruded, and in any event, should be so chosen as to permit the easy removal of surface contaminant from the polycrystalline scintillator. It will be apparent that, if the macrocrystal were permitted to melt, the crystalline structure of the extrudate would be destroyed, negating its usefulness as a scintillator. In general, die openings on the extrusion press are either cylindrical or rectangular, but any desired shape, such as triangular, semicircular, or annular, for the production of hollow extrudates, may be employed. The only limitations as to the dimensions of the extrudate are those dictated by practical necessity. Very large sections, as for windows in a spacecraft, may be extruded substantially as easily as polycrystalline scintillation fibers. Surprisingly, the pressure required to force a macrocrystal through a die opening, and, to convert its monocrystalline structure to a polycrystalline one is relatively low, being less than 10,000 p.s.i. for most doped alkali metal halides for extrusion ratios up to about 10:1, the temperature always being less than the melting point of the macrocrystal to be extruded. The pressure required to extrude an alkaline earth metal halide such as $CaF_2$ has been found to be higher; for example, about 13,000 p.s.i. is required for a 10:1 extrusion ratio to yield an useful extrudate. Pressures to 45,000 p.s.i. may be needed to improve extrudate quality and decrease the extrusion time.

It has been found that extrusion of doped alkali metal halides may be effected at temperatures as low as about room temperature, and even lower, but extrusions at these low temperatures yield scintillation phosphors of inferior quality. Highest quality scintillation phosphors are obtained at a temperature in excess of one-half the melting point of the crystalline material, measured in degrees Centigrade, but below the melting point of the material. The extrusion is most preferably carried out at a temperature within about 100° C. of the melting point of the macrocrystal.

Sufficient force must be exerted on the macrocrystal to be extruded, to provide a pressure large enough to force the macrocrystal through the die opening. Pressures higher than the minimum amount required will serve to accelerate the rate of extrusion. It will be recognized that the choice of pressure will depend upon the extrusion ratio, the effective or nominal diameter of the extrudate, the particular doped alkali metal halide used, and the die design and materials of construction to minimize tearing of the crystal structure and the formation of voids. It is essential that the polycrystalline extrudate be fully dense and contain no intergranular or intercrystalline voids on a macroscopic scale, namely, greater than about 100 times the interatomic distances within the crystal lattice structure, or the ability of the crystal to generate light is seriously impaired. Moreover, since the pulse of the scintillation phosphor must be determined by some counting means, it is imperative that the polycrystalline extrudate be pervious to the wave length of the light generated, as a result of the impact of ionizing radiation within the crystal.

The level of doping required for an alkali metal halide or alkaline earth metal halide depends upon particular usage of the scintillation phosphor. Factors affecting the choice of dopand or activator for a scintillator, and concentration of the dopand, are well known to those skilled in the art. In general, the level of dopand is less than about 10 mol per cent, and more preferably is in a range from about 1 part per million to about 1 mol per cent so as to give a uniform enough response to obtain acceptable resolution. Most preferably, the concentration of dopand is such as to have essentially no measurable effect on the melting point of the pure alkali metal halide, alkaline earth metal halide, or alloy host crystal $M_mX_n$ in which it is dispersed. Most preferred scintillators are sodium iodide doped with thallium, NaI(t1), cesium iodide doped with thallium, CsI(T1), potasssium iodide doped with thallium, KI(T1), lithium iodide doped with europium LiI(Eu), cesium iodide doped with sodium CsI(Na), thallium chloride doped with iodides T1C1(I), and calcium fluoride doped with europium, $CaF_2(Eu)$.

EXAMPLE I (A) A single crystal of thallium-activated sodium iodide, 2" diameter×3" long, is placed in the well of a conventional extrusion press fitted at one end with a metal die having an orifice of about 1 in. diameter, and at the other end with a snugly sliding piston. The well is surrounded by a furnace which has controllable heating elements to adjust the temperature of the crystalline material in the well. When the monocrystal of doped soium iodide has attained a temperature in the range from about 500° to 600° C., the piston is forced down by means of the plunger of a hydraulic press so as to exert a pressure in the range of from about 2000 to 4000 psi. The monocrystal in the well is extruded through the orifice to form a continuous cylindrical polycrystalline extrudate about 1 in. in diameter. The extrudate is cooled and cut into 1"×1" sections which are polished, and canned, in a standard and conventional manner to yield "Standard 1×1s referred to as "Type D" in a brochure entitled "Scintillation Phosphors" published by The Harshaw Chemical Company, Cleveland, Ohio."

(B) A single crystal section is cut from the same melt-grown (NaI (T1)) scintillation crystal ingot from which the extrudate described in (A) hereinabove is obtained. This section is polished and canned to yield a "Standard 1×1". 1".

(C) A section cut from the same melt-grown (NaI(T1) scintillator crystal ingot from which is obtained the extrudate, in the manner described in (A) hereinabove, is comminuted to a fine powder most of which passes a 325 mesh sieve (about 44 microns in diameter). The powder is placed in a die and is hot-pressed at a temperature of 150° C. for about 5 mins. under 60 tons load to form a right cylinder 1 in. in diameter and slightly longer than 1 in. The hot-pressed cylindrical section is cut and polished to give a 1×1 which is canned in the same manner as the 1×1 sections obtained in (A) and (B) hereinabove.

Five 1×1 canned phosphor samples obtained as in (A) and the phosphors obtained in (B) and (C) are evaluated identically to compare their scintillation characteristics which are listed in the following tables:

TABLE I
COMPARISON OF RELATIVE PULSE HEIGHT (RPH) AND RESOLUTION

| Standard 1 × 1 from | Structure | RPH (%) | Resolution (%) for Cs 137 source |
| --- | --- | --- | --- |
| (A) sample 1 | Polycrystalline | 119 | 8.20 |
| (A) sample 2 | Polycrystalline | 120 | 8.34 |
| (A) sample 3 | Polycrystalline | 119 | 7.95 |
| (A) sample 4 (B) | Polycrystalline | 128 | 7.85 |
| (A) sample 5 | Polycrystalline | 131 | 7.45 |
| (B) | Single Crystal | 120 | 8.64 |
| (C) | Polycrystalline | not measurable* | not measurable* |

*no photopeak is obtained; light output is such that sample is unsuitable for use as a scintillator.

The measure of performance of a scintillator detector is its capability to resolve a preselected monoenergetic gamma ray. From a comparison of the resolutions, which is a primary criterion for comparison of scintillation phosphors, it is seen that the polycrystalline extrudates exhibit essentially the same scintillation properties as the original monocrystal, or better. It should be noted that the lower the resolution numerically, the better the scintillation detector (see "Scintillation Phosphors", published by The Harshaw Chemical Company, Cleveland, Ohio). Similarly, a polycrystalline extrudate of indefinite length may be made by utilizing a substantially larger single crystal or multiple crystal ingot, or by feeding ingots one after the other. The polycrystalline extrudate is a practical means for the mass production of finished optics by slicing and polishing, since, by controlling the conditions of extrusion, precise dimensions of the extrudate may be maintained.

Referring now to FIG. 1 there is shown a pair of scintillation pulse decay time curves, one for a single crystal ingot and the other for an extrudate, utilizing standard 1×1 sections and the same source. As is seen from the curves they are essentially identical. It should be noted that though the ordinate scale is arbitrary, it is the same for each curve. The decay time is calculated from the curves. As seen from Table II set forth hereinbelow, the decay time for the single crystal is the same as the decay time for the extrudate at the same emission wavelength.

TABLE II
COMPARISON OF DECAY TIME FOR SCINTILLATION PULSES (4200 Å WAVELENGTH)

| Standard 1 × 1 from | Structure | Decay Time (Microseconds) |
|---|---|---|
| (A) sample 1 | Polycrystalline | 0.22 |
| (B) | Single Crystal | 0.22 |

Decay time is measured in a conventional manner utilizing a $Na^{22}$ X-ray source. A fast scintillation detector (anthracene) is used to trigger the detection system. Light output from the sample is detected by a photomultiplier tube via a monochromator which is set to transmit 4200A, and the signal is accumulated in a multi-channel analyzer. The foregoing method of measuring decay time is a modification of the technique taught by L.M. Bollinger and G.E. Thomas, Rev. Sci. (A) Inst. 32, 1044 (1961) and in Technical Report No. 3 entitled "Fluoresence Lifetime Measurements by Time Correlated Single Photon Counting" by William R. Ware, ONR (A) Contract N00014-67-A-0113-006 (March 1969).

A comparison of count rates is made between single crystal and extruded polycrystalline scintillators, this being indicative of the respective efficiencies. A standard 1×1 section of each is used with a $Cs^{137}$ gamma ray source at the same nominal distance, with the same test geometry, and both measurements are made within a period of about 20 minutes. In each case a total count rate over the entire spectrum, and a count rate in the peak, is obtained, and are set forth hereinbelow in Table III.

TABLE III
COMPARISON OF COUNT RATES

| | Single Crystal Scintillator | Extruded Scintillator |
|---|---|---|
| Total count rates in entire spectrum, counts/sec. | 3278 | 3153 |
| Count rate in the peak, counts/sec. | 757 | 724 |

The count rates are essentially identical. Slight variations in measurements can be expected because the count rate is dependent upon the volume of the crystal, its precise geometry, and the geometry of the test itself; these factors are not generally identical, and the slight differences are reflected in the count rates.

EXAMPLE II

A comparison of crush strength is made between a single crystal scintillator and the polycrystalline extrudate, each as a standard 1×1 section of NaI(T1), by placing between the platens of a hydraulic press and applying a load.

The single crystal section commenced to crack under about 200 lbs. load, and would not support 1000 lbs. load. It was crushed.

The polycrystalline scintillator did not commence to crack until nearly 2000 lbs. load was applied. The section supported 2000 lbs. load and was essentially undistorted. It supported 3000 lbs. load without being crushed, though it was distorted.

EXAMPLE III

A comparison of yield strength is made between a single crystal scintillator bar and a polycrystalline extrudate bar utilizing bars of NaI(T1) having a $\frac{3}{8}''\times\frac{3}{8}''$ cross section. Yield strength is determined by measuring the bend deflection of the bars and applied load using a four point bend fixture in an Instron test machine. A comparison of yield strengths is more meaningful than ultimate fracture strength because the latter is highly sensitive to surface finish, and a direct comparison of fracture strength would require comparable finishes.

TABLE IV
COMPARISON OF YIELD STRENGTH

| Single Crystal Scintillator | | Polycrystalline Extrudate Scintillator | |
|---|---|---|---|
| Sample # | Yield strength, psi | Sample # | Yield strength, psi |
| 1 | 270 | 1 | 839 |
| 2 | 324 | 2 | 1067 |
| 3 | 324 | 3 | 526 |
| 4 | 252 | 4 | 1138 |
| Average | 296 | Average | 896 |

It is seen that the yield strength of the polycrystalline extrudate is several times greater than the yield strength of the single crytal.

EXAMPLE IV

A plurality of crystal ingots of thallium-activated sodium iodide, having a nominal diameter in the range from about 2 ins. to about 4 ins., each crystal being at least as long as its nominal diameter, is extruded in the same apparatus as used in Example I hereinabove. The temperature of the crystals in the well is maintained below their melting point, in the range from about 500° to about 600° C., and the pressure exerted by the hydraulic press is adjusted in the range from about 1500 to 2000 p.s.i. A continuous polycrystalline extrudate 1"×2" in cross section is formed. Optical and scintillation properties as observed in scintillation detectors fabricated from the extrudate are at least equal to those of the monocrystalline material. The average grain size of the 1"×2" polycrystalline extrudate is about 3 mm. The grain size depends upon the temperature of extrusion, the length of time the macrocrystal is maintained near the melting point but below it, the extrusion ratio, and the rate of extrusion. Thus, the grain size of a polycrystalline extrudate is in the range from about 10 microns to about one centimeter.

EXAMPLE V

A plurality of crystal ingots of thallium-activated cesium iodide, having a nominal diameter in the range from about 2" to about 4", each crystal being at least as long as its nominal diameter, is placed in the well of the same extrusion press as used in the previous examples hereinabove. The temperature is adjusted in the range from about 500° to 600° C., and the pressure in the range from 800 to 1000 psi to form an extrudate 1"×2" in cross section, which is continuous and has an essentially polycrystalline structure.

The same procedure is repeated with a multiple crystal ingot and a die having an orifice 0.125" in diameter, the temperature is maintained in the range from about 500° to 600° C., and the pressure is raised to 14,000 psi, whereupon a continuous polycrystalline extrudate about 0.125" in diameter is formed. Predetermined lengths of the continuous extrudate are cut off as required. Optical and scintillation properties of the 0.125" diameter extrudate are essentially the same as those of the 2"×3" extrudate, which in turn are essentially the same as those of the monocrystal.

Modifications, changes and improvements of the preferred forms of the invention herein disclosed, described and illustrated may occur to those skilled in the art who come to understand the principles and precepts thereof. Accordingly, the scope of the patent to be issued herein should not be limited to the particular embodiments of the invention set forth herein, but rather should be limited by the advance by which the invention has promoted the art.

We claim:

1. A scintillation phosphor formed by extrusion of a cleavable macrocrystal melt-grown starting material selected from an alkali metal halide containing an activator and an alkaline earth metal halide containing an activator, said extrusion being affected at a temperature in excess of one-half the melting point of said macrocrystal, measured in degrees centigrade, but below its melting point, at a pressure sufficient to force said macrocrystal through an orifice which is smaller in cross section than the cross section of said macrocrystal so as to form a fully dense, entirely polycrystalline scintillator extrudate having grains in a size range from about 10 microns to about 1 centimeter, said extrudate being further characterized by: being at least twice as strong and resistant to shock and less subject to cleavage than the macrocrystal starting material; having essentially the same or better scintillation properties decay time and light disseminating efficiency as said macrocrystal, being free from intergranular or intercrystalline voids on a macroscopic scale greater than about 100 times the interatomic distances within the crystal lattice structure; and being pervious to the wavelength of the light generated as a result of the impact of ionizing radiation within the crystal.

2. The scintillation phosphor of claim 1 wherein said temperature is within about 10° C. of the melting point of the macrocrystal.

3. The scintillation phosphor of claim 1 wherein the alkali metal halides containing an activator are sodium iodide activated with thallium, cesium iodide activated with thallium, potassium iodide activated with thallium, lithium iodide activated with europium, cesium iodide activated with sodium, thallium chloride activated with iodides and wherein said alkaline earth metal halide containing an activator is calcium fluoride activated with europium.

4. The scintillation phosphor of claim 3 wherein said alkali metal halide containing an activator and alkaline earth metal halide containing an activator is melt-grown with an activator present in an amount in the range from about 1 part per million to about 1 mole percent of said macrocrystal.

5. The phosphor of claim 1 wherein the material consists of sodium iodide activated with thallium.

* * * * *